Patented Feb. 6, 1945

2,368,764

UNITED STATES PATENT OFFICE 2,368,764

MANUFACTURE OF CELLULOSE MIXED ESTERS

Bayard T. Lamborn, Matawan, N. J., assignor to Hercules Powder Company, Wilmington, Del., a corporation of Delaware No Drawing. Application October 6, 1942, Serial No. 460,980

13 Claims. (Cl. 260—225)

This invention relates to a process for preparing cellulose mixed esters and more particularly to a process for preparing cellulose mixed esters in which certain low boiling solvents are used.

The manufacture of cellulose mixed esters of fatty acids is generally carried out by the reaction of cellulose with one or more of the anhydrides of the fatty acids to be introduced into the cellulose molecule. The reaction takes place with the aid of an acylation catalyst, such as sulfuric acid, of about 1 to 5% concentration. The reaction takes place in a bath containing a relatively large amount of a solvent for the mixed ester such as a halogenated aliphatic compound like ethylene chloride or a lower fatty acid, such as acetic acid, one or more of its homologs, or mixtures thereof.

In order to obtain a high quality product with a desirably high viscosity, it is necessary to control the temperature of the process. In laboratory or pilot plant equipment, little difficulty is encountered in maintaining low temperatures, such as 30° C., but on a plant scale where external cooling action is very much less effective than in smaller equipment, the difficulty of heat removal is pronounced and, hence, it becomes difficult to produce a high quality product. Attempts have been made to operate the process using methylene chloride to reduce the reaction temperature but a rather low esterification temperature is necessary in order to obtain the desired viscosity with this compound.

Now in accordance with this invention, it has been found that the use of a stable chloro-fluoro-hydrocarbon in the esterification reaction will substantially reduce the esterification temperature and a product is obtained with the most desirable viscosity.

The use of a chloro-fluoro-hydrocarbon such as trichloro-fluoro-methane, which has a boiling point of 23.7° C., has been found to be an effective means for regulating the temperature of reaction during esterification. As the temperature of the reaction rises some of the heat vaporizes the trichloro-fluoro-methane and the temperature of the bath is accordingly decreased. The amount of this cooling may be regulated by the volume of the trichloro-fluoro-methane used. The trichloro-fluoro-methane is also a satisfactory solvent for the mixed ester and when completely driven off will leave a product which has a desirably high viscosity.

The use of these chloro-fluoro-hydrocarbons also allows for easy recovery. The vapors from the boiling esterification bath may be collected and condensed to the liquid phase in a reflux apparatus with substantially complete recovery of the chloro-fluoro-hydrocarbon that has boiled off. The condensed material is then returned and refluxed again. The chloro-fluoro-hydrocarbon is removed at the time of precipitation of the mixed ester by means of distillation without disturbing the extraction of the cellulose ester because of the low boiling point of the chloro-fluoro-hydrocarbon.

The following are examples of methods of carrying out the process:

Example 1

The following formulation was used to give a cellulose acetate butyrate containing 30–35% combined butyryl:

|   | Grams |
| --- | --- |
| Cellulose (cotton linters) | 30 |
| Acetic acid | 10.9 |
| Butyric anhydride | 112 |
| Acetic anhydride | 19.5 |
| Trichloro-fluoro-methane (Freon 11) | 90 |
| Sulfuric acid | 0.64 |

The linters and acetic acid were first mixed together and then the remaining ingredients added and mixed in a suitable vessel provided with a reflux condenser. The trichloro-fluoro-methane which boiled off was condensed in the reflux condenser and returned to the mixture. Trichloro-fluoro-methane was removed by atmospheric and vacuum distillation before precipitating the ester.

Example 2

The following formulation was used to give a cellulose acetate caproate containing about 10% combined caproyl:

| | | |
| --- | --- | --- |
| Cellulose (cotton linters) | grams | 600 |
| Acetic acid | cc | 230 |
| Caproic acid | cc | 2,090 |
| Acetic anhydride | cc | 1,665 |
| Trichloro-fluoro-methane (Freon 11) | cc | 800 |
| Sulfuric acid | cc | 3.25 |

The cellulose and acetic acid were first mixed together and then the other ingredients were added and the whole mixed in a suitable vessel provided with a reflux condenser. The trichloro-fluoro-methane that boiled off the reaction mixture was condensed in the reflux condenser and returned to the mixture. When the reaction was completed, the trichloro-fluoro-methane was removed by atmospheric and vacuum distillation before precipitating the ester.

It has been found that optimum conditions for esterification are the use of about 2% of concentrated sulfuric acid as the catalyst (based on the weight of the cellulose) with an acylation temperature of about 30° C. With higher catalyst concentrations, such as from 3 to 5% sulfuric acid, a temperature of about 15° C. is preferred to maintain proper viscosity. With a catalyst concentration of about 1% of sulfuric acid, a temperature of about 40° C. is preferred to effect complete esterification in a reasonable time. Both extremes tend toward a lower viscosity than that obtained under the optimum conditions. In any case, an operating temperature at least within the range of from about 5° C. to about 50° C. is desirable and it is to maintain a temperature in this range that the chloro-fluoro-hydrocarbon is used.

While trichloro-fluoro-methane has been described as the hydrocarbon used in the examples, other chloro-fluoro-hydrocarbons have been found to give desirable results such as dichloro-monofluoro-methane (boiling point 8.9° C.), dichloro-tetrafluoro-ethane (boiling point 3.5° C.), and trichloro-trifluoro-ethane (boiling point 47.7° C.). While all the above have been found useful, trichloro-fluoro-methane gives the most desirable results because it allows the best control and ease of operation when operating under the optimum conditions, i. e., at a temperature of about 30° C.

The chloro-fluoro-hydrocarbons described may be used in the production of any of the cellulose mixed esters but have been particularly successful in the production of a cellulose acetate butyrate, cellulose acetate caproate, and cellulose acetate stearate.

The amount of the chloro-fluoro-hydrocarbons may be varied considerably but, in general, should be calculated to produce the optimum temperature for the percentage of catalyst, such as sulfuric acid, used. They may be substituted in part or entirely for the acetic acid or methylene or ethylene chloride ordinarily used as the solvent for the ester. It is most desirable, however, to pretreat the cellulose with at least a small amount of acetic acid and then add the other ingredients including the chloro-fluoro-hydrocarbons.

For a mix using trichloro-fluoro-methane to be kept at the optimum temperature will usually require from 1 to 3 times as much of the chloro-fluoro-methane as cellulose.

The esterifying apparatus for carrying out the invention may comprise a mixing vessel into which all of the ingredients are introduced. The evaporated chloro-fluoro-hydrocarbon is led from the top of the mixer during the esterification and conducted to a condensation apparatus where it is recovered in the liquid state. This liquid may then be returned to the mixer in such a manner that the esterification is carried out continuously.

Thus, the present invention has described the use of a chloro-fluoro-hydrocarbon to maintain an optimum temperature in the esterification of a cellulose mixed ester whereby a desirably high viscosity can be attained. The chloro-fluoro-hydrocarbon is recovered after the esterification and hence the cost of this highly desirable step is small.

What I claim and desire to protect by Letters Patent is:

1. In a process for the manufacture of cellulose mixed esters, the step of carrying out the esterification reaction in the presence of a stable chloro-fluoro-hydrocarbon having a boiling point below 50° C.

2. In a process for the manufacture of cellulose mixed esters, the step of carrying out the esterification reaction in the presence of trichloro-fluoro-methane in quantities capable of substantially cooling the reaction mixture.

3. In a process for the manufacture of cellulose mixed esters, the step of reacting the ingredients comprising cellulose, acetic acid, acetic anhydride, another fatty acid anhydride, a chloro-fluoro-hydrocarbon having a boiling point below 50° C., and a suitable catalyst.

4. In a process for the manufacture of cellulose acetate butyrate, the step of reacting the ingredients comprising cellulose, acetic acid, butyric anhydride, acetic anhydride, trichloro-fluoro-methane in quantities capable of substantially cooling the reaction mixture, and a suitable catalyst.

5. In a process for the manufacture of cellulose acetate caproate, the step of reacting the ingredients comprising cellulose, acetic acid, caproic acid, acetic anhydride, trichloro-fluoro-methane in quantities capable of substantially cooling the reaction mixture, and a suitable catalyst.

6. In a process for the manufacture of cellulose mixed esters the step of refluxing the reactants with a stable chloro-fluoro-hydrocarbon having a boiling point below 50° C. so that the heat of reaction may be kept at a predetermined temperature.

7. In a process for the manufacture of cellulose mixed esters the step of adding trichloro-fluoro-methane to the esterification reaction in an amount between about 1 to about 3 times the weight of the cellulose.

8. In a process for the manufacture of cellulose mixed esters the step of refluxing the esterification reaction mixture with a stable chloro-fluoro-hydrocarbon having a boiling point below 50° C. in an amount sufficient to maintain the temperature at about 30° C.

9. The process for the manufacture of cellulose mixed esters comprising mixing acetic acid and cellulose, subsequently adding acetic anhydride, another fatty acid anhydride, sulfuric acid, and a stable chloro-fluoro-hydrocarbon having a boiling point below 50° C., refluxing the entire mixture to maintain a predetermined temperature, removing the stable chloro-fluoro-hydrocarbon by distillation and precipitating the esters.

10. The process for the manufacture of cellulose mixed esters comprising treating cellulose with acetic acid, adding acetic anhydride, another fatty acid anhydride, a stable chloro-fluoro-hydrocarbon having a boiling point below 50° C., and sulfuric acid based on the weight of the cellulose, refluxing the entire mixture to maintain the temperature at about 30° C., removing the stable chloro-fluoro-hydrocarbon by distillation and precipitating the esters.

11. In a process for the manufacturing of cellulose mixed esters, the step of refluxing the esterification reaction mixture with a stable chloro-fluoro-hydrocarbon having a boiling point below 50° C. in an amount sufficient to maintain the temperature between about 5° and about 50° C.

12. In a process for the manufacturing of cellulose mixed esters, the step of refluxing the esterification reaction mixture with trichloro-fluoro-methane in an amount sufficient to maintain the temperature between about 5° and about 50° C.

13. In a process for the manufacture of cellulose mixed esters, a step of carrying out the esterification reaction by refluxing in the presence of a stable chloro-fluoro-hydrocarbon having a boiling point below 50° C.

BAYARD T. LAMBORN.